United States Patent
Craig et al.

(10) Patent No.: US 8,951,607 B2
(45) Date of Patent: Feb. 10, 2015

(54) MAKING CO-PRECIPITATED MIXED OXIDE-TREATED TITANIUM DIOXIDE PIGMENTS

(75) Inventors: Daniel H. Craig, Edmond, OK (US); Venkata Rama Rao Goparaju, Edmond, OK (US)

(73) Assignee: Tronox, LLC, Oklahoma City, OK (US)

( * ) Notice: Subject to any disclaimer, the term of this patent is extended or adjusted under 35 U.S.C. 154(b) by 650 days.

(21) Appl. No.: 11/799,876

(22) Filed: May 3, 2007

(65) Prior Publication Data
US 2008/0271642 A1 Nov. 6, 2008

(51) Int. Cl.
*B05D 7/00* (2006.01)
*B01J 13/02* (2006.01)
*C09C 1/36* (2006.01)

(52) U.S. Cl.
CPC ................................. C09C 1/3661 (2013.01)
USPC ........ 427/212; 427/213.3; 427/215; 427/216; 427/217; 106/400

(58) Field of Classification Search
USPC ............................... 427/212, 256, 331, 430.1
See application file for complete search history.

(56) References Cited

U.S. PATENT DOCUMENTS

| | | | |
|---|---|---|---|
| 2,357,089 A | 8/1944 | Daiger et al. | |
| 2,387,534 A | 10/1945 | Seidel | |
| 2,913,419 A | 11/1959 | Alexander et al. | |
| 3,513,007 A | 5/1970 | Lederer et al. | |
| 3,649,322 A * | 3/1972 | Foss | 106/446 |
| 3,825,438 A | 7/1974 | Prichard et al. | |
| 3,856,929 A | 12/1974 | Angerman et al. | |
| 3,876,442 A * | 4/1975 | Thomas | 106/446 |
| 4,040,859 A * | 8/1977 | Esselborn et al. | 106/417 |
| 4,050,951 A * | 9/1977 | Piccolo et al. | 106/446 |
| 4,052,224 A | 10/1977 | Howard | |
| 4,115,144 A | 9/1978 | Chambers et al. | |
| 4,120,806 A * | 10/1978 | Watanabe et al. | 252/62.54 |
| 4,224,080 A * | 9/1980 | Chambers et al. | 106/439 |
| 4,328,040 A | 5/1982 | Panek et al. | |
| 4,405,376 A | 9/1983 | Matsunaga et al. | |
| 4,450,012 A | 5/1984 | Messer et al. | |
| 4,759,800 A | 7/1988 | Luginsland et al. | |
| 4,781,761 A | 11/1988 | Jacobson | |
| 5,201,949 A | 4/1993 | Allen et al. | |
| 5,203,916 A | 4/1993 | Green et al. | |
| 5,332,433 A | 7/1994 | Story et al. | |
| 5,700,318 A | 12/1997 | Brand et al. | |
| 5,730,796 A * | 3/1998 | Brand et al. | 106/446 |
| 5,753,025 A | 5/1998 | Bettler et al. | |
| 5,976,237 A | 11/1999 | Halko et al. | |
| 6,200,375 B1 * | 3/2001 | Guez et al. | 106/438 |
| 6,562,314 B2 | 5/2003 | Akhtar et al. | |
| 7,135,065 B2 | 11/2006 | Drews-Nicolai et al. | |
| 7,147,702 B2 | 12/2006 | Drews-Nicolai et al. | |
| 7,682,441 B2 | 3/2010 | Drews-Nicolai et al. | |
| 7,842,131 B2 | 11/2010 | Blumel et al. | |
| 2004/0025749 A1 | 2/2004 | Drews-Nicolai et al. | |
| 2005/0011408 A1 | 1/2005 | Drews-Nicolai et al. | |
| 2005/0135994 A1 * | 6/2005 | Frerichs et al. | 423/610 |
| 2005/0138994 A1 * | 6/2005 | Hashemian | 73/66 |
| 2005/0228112 A1 * | 10/2005 | Takahashi et al. | 524/497 |
| 2006/0032402 A1 | 2/2006 | Drews-Nicolai et al. | |
| 2006/0034739 A1 | 2/2006 | Drews-Nicolai et al. | |

FOREIGN PATENT DOCUMENTS

| | | |
|---|---|---|
| DE | 103 32 650 A1 | 2/2005 |
| EP | 0 595 471 B1 | 6/1996 |
| GB | 1256421 | 12/1971 |

OTHER PUBLICATIONS

Written Opinion of the International Searching Authority—PCT/US2008/005394, mailed Nov. 12, 2009—Tronox LLC.
The Manufacture of Aluminum Sulfate, New Zealand Institute of Chemistry, http://nzic.org.nz/ChemProcesses/production, last accessed Dec. 21, 2011 (5 total pages).
ABC CHEMIE in zwei Banden, 2 Aufi. (1965), S 59.

* cited by examiner

*Primary Examiner* — Austin Murata
(74) *Attorney, Agent, or Firm* — McAfee & Taft

(57) ABSTRACT

Simplified and improved processes are provided for manufacturing titanium dioxide pigments including a surface treatment whereby a plurality of inorganic oxides or a combination of one or more inorganic oxides with one or more inorganic phosphates are applied to a titanium dioxide base pigment. Aqueous acid-soluble sources of the desired inorganic oxides and/or phosphates are predissolved in an aqueous acid, and these can be added on a batch wise or more preferably on a continuous basis to an alkaline slurry containing the titanium dioxide base pigment and to which aqueous alkaline-soluble sources of the desired inorganic oxides are being or have been added previously. Co-precipitation of the oxides and/or oxides and phosphates is then accomplished by an adjustment of the pH, to provide a surface treated pigment with excellent homogeneity of the deposited mixed oxides and/or oxides and phosphates.

24 Claims, No Drawings

MAKING CO-PRECIPITATED MIXED OXIDE-TREATED TITANIUM DIOXIDE PIGMENTS

FIELD OF THE INVENTION

This invention relates to processes for making titanium dioxide pigments including a co-precipitated mixed inorganic oxide or mixed oxide/phosphate surface treatment. The resulting pigments are useful in many industries including the coatings, paper, and plastics industries.

BACKGROUND OF THE INVENTION

Titanium dioxide is used as an opacifier and colorant in many industries, including the coatings, plastics, and paper industries. In general, the effectiveness of the pigment in such applications depends on how evenly the pigment can be dispersed in a coating, in plastic or in paper. For this reason, pigments are generally handled in the form of a finely divided powder. However, titanium dioxide powders are inherently dusty and frequently exhibit poor powder flow characteristics, especially during formulation, compounding, and manufacture of end-use products. While free-flowing powders with low dust properties can be obtained through known manufacturing practices, these powders usually exhibit reduced opacifying properties.

To this end, chemical methods of modification of titanium dioxide pigment surfaces have been developed to achieve the desired balance of pigment opacity and flow characteristics. For instance, it is known in the art that the wetting and dispersing properties of titanium dioxide pigments can be improved by exposure of a titanium dioxide intermediate (produced by either a sulfate or chloride process) to certain inorganic treatments through the deposition of inorganic metal oxide and/or metal hydroxide coatings on the surface of the titanium dioxide. Typically these treatments are accomplished by:

(1) dispersing the intermediate (or crude) material in an aqueous medium using a dispersing agent such as a polyphosphate, (2) optionally wet milling the resulting slurry to achieve a certain desired particle size, (3) precipitating one or more inorganic oxides such as silica or alumina onto the particle surfaces of the titanium dioxide slurry, (4) recovering the inorganic oxide treated titanium dioxide pigment from the aqueous slurry by filtration, (5) washing the filtered product to remove salts and impurities, (6) drying the washed filtered product, and (7) dry-milling the dried pigment using a fluid energy mill.

Typically the wet treatment deposition of inorganic oxides according to step (3) is accomplished—for pigments treated with more than one inorganic oxide—in a sequential fashion, one inorganic oxide at a time. However, it is also known to chemically treat titanium dioxide pigment intermediates with co-precipitated mixed inorganic oxides. Apart from reducing the total number of inorganic surface treatments to be performed, titanium dioxide pigments bearing co-precipitated mixed inorganic oxide treatments perform differently as compared to pigments wherein the same inorganic oxides are added sequentially.

A number of references describe or at least suggest titanium dioxide pigments including a co-precipitated, mixed inorganic oxide surface treatment. For example, U.S. Pat. No. 2,913,419 discloses a broad range of particles, including titanium dioxide particles, surface treated with dense silica-containing codeposited silicates and/or metal oxides selected from the group of silicates and oxides of metals which form insoluble silicates at a pH between five and twelve, including silicates and oxides of aluminum, tin, titanium, zinc, and zirconium.

U.S. Pat. No. 3,513,007 claims an improved process for coating titanium dioxide pigment particles comprising the treatment of titanium dioxide pigment particles in an aqueous medium, in two sequential steps, with first at least one compound selected from the group consisting of water-soluble hydrolysable compounds of silicon, titanium, zirconium, and phosphates, and secondly with at least one water-soluble hydrolysable compound of aluminum, cerium, calcium, or mixtures thereof, while maintaining the pH of the suspension in the range of six to ten. The pigments produced according to the process of the invention are said to exhibit higher tinting strength and gloss when incorporated into paints.

Great Britain Patent 1,256,421 describes an improved process for treating metal oxide particles which have already been treated with a coating of one or more oxides or hydrous oxides of titanium, aluminum, cerium, silicon, zinc, zirconium, or a phosphate, with an alkaline aqueous solution of hydrolysable aluminum salt to provide a second alumina coating. Specific examples of the initial mixed oxide coatings comprise titania/alumina or zirconia/alumina. Such treatments are said to result in improved pigment durability and gloss properties.

U.S. Pat. No. 3,649,322 discloses an aluminum silicate-encapsulated pigmentary titanium dioxide, combining high tinting strength and durability in coating compositions, which is prepared by co-precipitating hydrous silicon oxide with hydrous aluminum oxide onto titanium dioxide in aqueous slurry, to form a dense coating of aluminum silicate. When the dense aluminum silicate coating is applied in a single stage, the pigment is further treated with an additional coating of aluminum oxide.

U.S. Pat. No. 3,825,438 claims a process for coating titanium dioxide pigments with at least one hydrous oxide of a metal, comprising mixing an aqueous dispersion of titanium dioxide pigment with at least one water-soluble hydrolysable compound of a metal selected from the group consisting of aluminum, titanium, cerium, zirconium, silicon and zinc, then adding to the dispersion a polyhydric alcohol containing at least two hydroxy groups and from two to eight carbon atoms, and finally precipitating a hydrous oxide of the metal onto the surface of the particles of titanium dioxide by effecting a change in the pH of the dispersion. The examples teach co-precipitated treatments derived from mixed solutions of titanyl sulfate and aluminum sulfate. The pigments produced by the process of the invention can be used in a wide variety of products, including paints, plastics, and paper.

U.S. Pat. No. 4,052,224 discusses a process for treating a titanium dioxide pigment, using first a mixed solution of water-soluble compounds of aluminum, zirconium, and titanium, and then providing a final inorganic surface treatment with an aluminum phosphate. The resulting pigments are described as particularly useful in the manufacture of paints having reduced photochemical activity, and in the manufacture of paper laminates.

U.S. Pat. No. 4,115,144 describes the co-precipitation of metal oxides (such as, for example, alumina and titania) onto a titanium dioxide pigment, through dissolving water-soluble compounds that will precipitate as or be convertible to the desired mixed metal oxide form in water, and then adding this solution to an aqueous dispersion of titanium dioxide and precipitating the metal oxides under alkaline conditions as through the addition of sodium hydroxide. After filtration and washing, the coated and washed titanium dioxide is hot aged in the presence of water under alkaline conditions, the hot ageing step being described as necessary to avoid processing difficulties and give "suitable charge and pH characteristics".

U.S. Pat. No. 4,328,040 describes a process for the production of titanium dioxide pigments with "improved chalking resistance and gloss retention", wherein oxides and/or phosphates of titanium, zirconium, aluminum and silicon are applied to titanium dioxide, by adding alkaline zirconium carbonate complexes of the alkali metals or ammonium to an aqueous alkaline pigment suspension, and then adding a solution of dissolved compounds of titanium and/or aluminum and/or silicon and/or phosphorus to slowly precipitate the oxides and/or phosphates onto the pigment.

U.S. Pat. No. 4,405,376 provides a titanium dioxide pigment and a process for making the same, wherein the pigment comprises a pigmentary titanium dioxide core particle, a mixed inner coating of hydrous oxides of tin and zirconium, and an outer coating of a hydrous oxide of aluminum.

U.S. Pat. No. 4,450,012 discloses coated rutile mixed phase pigments having a first coating of an oxide or mixture of oxides of titanium, zirconium, or tin, and a subsequent coating of an oxide of aluminum. The resulting pigments exhibit an improved tendency against flocculation in lacquers hardened with acid catalysts.

U.S. Pat. No. 4,759,800 describes a process for chemically treating titanium dioxide pigment wherein titania is deposited first from a solution of titanium oxychloride, and then an alumina outer treatment is performed. Many examples illustrate the co-deposition, or co-precipitation, of other metal oxides along with the deposited titania, including titania/alumina, titania/zirconia, and zirconia/titanialsilica co-precipitated combinations. The resulting pigments purportedly exhibit improved weathering resistance and optical properties.

U.S. Pat. No. 4,781,761 discloses that co-deposition of boria with silica, preferably from a master solution containing water-soluble sodium silicate and sodium borate, enables the formation of dense silicate coatings on titanium dioxide particles at lower processing temperatures than used previously to achieve dense silica coatings. The resulting boria-modified silica-containing pigments are highly lightfast, and exhibit excellent gloss and dispersibility.

U.S. Pat. No. 5,753,025 discloses a process for making a rutile titanium dioxide pigment suitable for use in making coatings having improved gloss, through co-deposition of boric with silica, followed by treatment with an oxide of aluminum.

U.S. Pat. No. 7,135,065 describes the production of titanium dioxide pigments in which aqueous solutions of water-soluble compounds of tin and zirconium as well as at least one more of aluminum, silicon and titanium are added to an aqueous suspension of titanium dioxide base material maintained at a pH of not more than 3 or less than 10, and then the pH value of the suspension is adjusted to between 6 and 8 to cause the corresponding oxides to be deposited on the titanium dioxide base material.

U.S. Patent Application Publication 20040025749 A1 discloses a method for preparation of titanium dioxide pigment exhibiting high greying resistance and high hiding power, in which the pH value of a suspension of titanium dioxide material, a phosphorus compound, a titanium compound and an aluminum compound is adjusted to about 9, followed by the addition of a magnesium compound while maintaining the pH value above about 8.5.

U.S. Patent Application Publication 20050011408 A1 describes a method for the surface treatment of a titanium dioxide pigment, comprising the steps of: a) adding an aluminum component and a phosphorus component to a titanium dioxide suspension while the pH value of the suspension is maintained at a value greater than or equal to ten; and then b) adding an acid component to the suspension until the pH value is less than nine. It is also taught that together with the aluminum component and the phosphorus component, other metal salt solutions, such as salts of cerium, titanium, silicon, zirconium, or zinc, can also be added to the suspension in step a), these subsequently being jointly precipitated onto the particle surface in step b) as phosphate or hydrated oxide.

U.S. Patent Application Publication 20060032402 A1 relates to titanium dioxide pigment particles having two or more layers deposited thereon, wherein at least one of the two or more layers is a dense silicon dioxide layer comprising silicon dioxide containing no significant quantity of metal atoms other than silicon, and wherein at least one of the two or more layers is a dense silicon dioxide layer containing a significant quantity of co-precipitated oxides of metal ions or mixtures of metal ions other than silicon. The resulting pigments are weather resistant and particularly suitable for use in surface coatings and plastics.

U.S. Patent Application Publication 20060034739 A1 relates to a method for treatment of titanium dioxide characterized in that, together with the hydrous oxides of tin and zirconium, at least one other from the group consisting of aluminum, silicon, and titanium is additionally co-precipitated onto the particle surface. The treated pigment is subsequently treated with an oxide of aluminum. Compared with the prior art, the resulting pigments demonstrate a further improvement in photostability, while retaining good optical properties and are particularly suitable for use in paints, coatings, and plastics.

Despite the many titanium dioxide pigments thus described as having mixed inorganic oxides applied via co-precipitation or co-deposition, however, none of the aforementioned references anticipate or suggest the process efficiencies enabled by the present invention and described in greater detail below, nor the product consistency and uniformity of co-precipitant incorporation improvements realized through the present invention.

SUMMARY OF THE PRESENT INVENTION

The present invention concerns simplified and improved processes for manufacturing titanium dioxide pigments including a surface treatment whereby a plurality of inorganic oxides or a combination of one or more inorganic oxides with one or more inorganic phosphates are applied to a titanium dioxide base pigment.

In a first embodiment, a process according to the present invention comprises the steps of a) preparing an aqueous alkaline slurry of titanium dioxide base pigment from a sulfate or chloride process and in which at least one aqueous alkali-soluble source of an inorganic oxide has been dissolved, b) dissolving at least one aqueous acid-soluble source of an inorganic oxide and/or at least one aqueous acid-soluble salt of a cation capable of forming a water-insoluble phosphate, into an aqueous sulfuric acid solution, then c) gradually adding said sulfuric acid solution to the aqueous alkaline slurry of titanium dioxide base pigment, the amount of added sulfuric acid solution being sufficient to achieve a final slurry pH value between about 4 up to about 8.5.

In a second embodiment, a process according to the present invention comprises the steps of a) dissolving at least one aqueous acid-soluble source of an inorganic oxide and/or at least one aqueous acid-soluble salt of a cation capable of forming a water-insoluble phosphate, into an aqueous sulfuric acid solution, b) dissolving at least one alkali-soluble source of an inorganic oxide into an aqueous alkaline solution, c) then gradually adding both said sulfuric acid solution and said aqueous alkaline solution to an aqueous alkaline slurry of titanium dioxide base pigment from a sulfate or chloride process, the amounts added of these solutions being such as to achieve a final slurry pH value between about 4 up to about 8.5.

DETAILED DESCRIPTION OF PREFERRED EMBODIMENTS OF THE PRESENT INVENTION

In the first embodiment, an improved process is provided for the co-precipitation of mixed inorganic oxides or oxide/phosphate combinations onto a titanium dioxide base pigment, which process preferably comprises the following steps:

(a) forming a mixture comprising titanium dioxide base pigment in water, said titanium dioxide base pigment having been produced by either a sulfate process or a vapor phase oxidation-based chloride process and wherein, optionally, at least one wet treatment inorganic oxide selected from the group consisting of the inorganic oxides of aluminum, boron, phosphorus, silicon, titanium and zirconium has been deposited on said titanium dioxide base pigment;

(b) adding to the slurry from step (a) at least one aqueous alkali-soluble oxide salt selected from the group consisting of the aqueous alkali-soluble oxide salts of aluminum, boron, phosphorus and silicon;

(c) dissolving i) at least one aqueous acid-soluble salt selected from the group consisting of the aqueous acid-soluble salts of aluminum, cerium, tin, titanium and zirconium and/or ii) at least one aqueous acid-soluble salt of a cation capable of forming a water-insoluble phosphate, into an aqueous sulfuric acid solution;

(d) gradually adding to the slurry prepared in step (b) said solution prepared in step (c), in an amount sufficient to achieve a final slurry pH value from about 4 to about 8.5, so as to facilitate a complete, uniform and consistent co-precipitation of the mixed inorganic oxides and/or inorganic oxide(s) and phosphate(s); and (e) after step (d), optionally depositing a wet treatment aluminum oxide onto the titanium dioxide particles in the slurry prepared in step (d), while maintaining said slurry pH between about 4 to about 8.5.

In the second embodiment, a process for the co-precipitation of mixed inorganic oxides onto titanium dioxide base pigment preferably comprises:

(a) forming a mixture comprising titanium dioxide base pigment in water, said titanium dioxide base pigment having been produced by either a sulfate process or a vapor phase oxidation-based chloride process and wherein, optionally at least one wet treatment inorganic oxide selected from the group consisting of the inorganic oxides of aluminum, boron, phosphorus, silicon, titanium and zirconium has been deposited on said titanium dioxide base pigment;

(b) forming an aqueous solution of at least one aqueous alkali-soluble oxide salt selected from the group consisting of the aqueous alkali-soluble oxide salts of aluminum, boron, phosphorus and silicon;

(c) dissolving into an aqueous sulfuric acid solution i) at least one aqueous acid-soluble salt selected from the group consisting of the aqueous acid-soluble salts of aluminum, cerium, tin, titanium and zirconium and/or ii) at least one other aqueous acid-soluble salt selected from the group consisting of the aqueous acid-soluble salts of aluminum, cerium, magnesium, titanium, zinc and zirconium;

(d) gradually adding to the slurry resulting from step (a), in two separate process streams, said solutions prepared in steps (b) and (c), in amounts sufficient to achieve a final slurry pH value in the range of from about 4 to about 8.5, so as to facilitate a complete, uniform and consistent co-precipitation of the mixed inorganic oxide(s) and/or oxide(s) and phosphate(s); and (e), after step (d), optionally depositing a wet treatment aluminum oxide, while maintaining said slurry pH between a value of about 4 to about 8.5.

The resulting treated titanium dioxide pigment particles are typically further processed through several additional manufacturing steps as elaborated below, including filtration, washing, drying, and fluid energy milling, in the presence or absence of additional known functional additives, to yield a finished pigment suitable for use in coatings, paper, plastics, and cosmetics.

Dissolving the aqueous acid-soluble source of inorganic oxide and/or water-insoluble phosphate into the aqueous sulfuric acid solution in the manner of the instant invention, prior to the adjustment of the slurry pH value with the sulfuric acid solution, provides a simplified process to achieve co-precipitated oxide and/or phosphate treatments in that fewer required reagent addition streams are used. Further, while co-precipitation of inorganic oxides as carried out in U.S. Pat. Nos. 4,115,144, 4,328,040 and 7,135,065, for example, is on a batch wise basis, the process of the present invention can in either embodiment be carried out on either a batch wise basis or more preferably on a continuous basis. Those skilled in the art will readily appreciate that for materials produced on a very large scale, as titanium dioxide pigments are, the ability to carry out a surface treatment process on a continuous basis offers very significant benefits and advantages.

In addition, greater product consistency is also achieved as compared to mixed oxide-treated pigments produced by the prior methods. While not wishing to be held to any one theory, it is speculated that the intimate molecular-level mixing that occurs through dissolving the acid-soluble source of inorganic oxide into the same sulfuric acid reagent as used to precipitate out the alkali-soluble inorganic oxide enables more uniform inorganic oxide and/or phosphate co-precipitation, correspondingly also allowing for increased control over and greater uniformity of the mixed oxide and/or phosphate stoichiometries during the co-precipitation process, as compared to processes of the prior art. Thus the process of the instant invention enables greater "fine-tuning" of pigment end-use properties.

Accordingly, the chemical methods described above provide for the co-precipitation of an aqueous acid-soluble source of an inorganic oxide and/or an aqueous acid-soluble salt of a cation capable of forming a water-insoluble phosphate during the precipitation of the aqueous alkali-soluble source of inorganic oxide. Thus, under the described conditions, the precipitation of the aqueous alkali-soluble component causes the precipitation of the otherwise soluble aqueous acid-soluble component. Therefore, in accordance with the described methods, the term "co-precipitation" refers to a chemical process wherein precipitation of one component would not occur but for the precipitation of another component.

In general, any type of titanium dioxide material can be processed in accordance with the instant invention. Preferred is rutile titanium dioxide base pigment produced from either the sulfate or chloride process. Most preferred is rutile titanium dioxide which has been produced via the chloride process from titanium tetrachloride using a vapor phase oxidation step. The titanium dioxide material can also contain an amount of alumina, from aluminum chloride which has been conventionally added as a rutilization aid during the vapor phase oxidation step along with the titanium tetrachloride. Other inorganic oxides formed during the oxidation step may be present as well, to the extent one skilled in the art may wish to incorporate other oxidizable inorganic materials in the oxidation step as has been described or suggested elsewhere for various purposes, for example, particle size control; see, for instance, U.S. Pat. Nos. 3,856,929, 5,201,949, 5,922,120 and 6,562,314.

The aqueous slurry of titanium dioxide base pigment can be usefully employed at concentrations from about 5% by weight of titanium dioxide up to about 65% by weight of titanium dioxide. Preferred are concentrations from about 15% by weight of titanium dioxide up to about 45% by weight. Most preferred are concentrations from about 25% by weight of titanium dioxide up to about 40% by weight.

Pertaining to step (a) in both aspects of the present invention, the optional wet treatment inorganic oxide can be applied utilizing any of the known processes to effect deposition of inorganic oxides onto the titanium dioxide. The number of treatments, and the manner of their application, are not critical, and various possibilities are well known to those skilled in the art, so further detail on this aspect is not necessary. Nevertheless, by way of example of known inorganic oxide treatment protocols, for plastics end-use applications U.S. Pat. Nos. 5,332,433 and 5,700,318 describe inorganic treatment protocols, as do U.S. Pat. Nos. 5,203,916 and 5,976,237 for coatings end-use applications. Typically, the optional wet treatment oxide when deposited, is present in an amount from about 0.5% up to about 5% by weight calculated on treated pigment.

The alkali-soluble source of inorganic oxide can be added to the aqueous slurry of titanium dioxide particles as an aqueous oxide salt solution, said solution containing from about 1% by weight up to about 50% by weight of dissolved alkali-soluble salt. Preferred are aqueous solutions containing from about 5% by weight up to about 40% by weight of dissolved alkali-soluble salt. Most preferred are aqueous solutions containing from about 15% by weight up to about 35% by weight of dissolved alkali-soluble salt. Preferred are sodium and potassium salts, or mixtures thereof.

The aqueous sulfuric acid solution comprises sulfuric acid in an amount from about 5% by weight up to about 98% by weight of the solution, but preferably is from about 20% by weight up to about 50% by weight of dissolved sulfuric acid and most preferably comprises from about 25% by weight up to about 40% by weight of dissolved sulfuric acid.

The acid-soluble source of inorganic oxide and/or acid-soluble salt of a cation capable of forming a water-insoluble phosphate can be dissolved into the aqueous sulfuric acid solution from a previously prepared aqueous metal salt solution or from a solid salt, said sulfuric acid solution ultimately containing dissolved acid-soluble salts in amounts calculated to achieve from about 0.05% up to about 8% of co-precipitated oxide and/or phosphate, by weight based on titanium dioxide. Preferred is dissolved acid-soluble salt in an amount calculated to achieve from about 0.1% up to about 5% of co-precipitated oxide and/or phosphate, by weight based on titanium dioxide. Most preferred is dissolved acid-soluble salt in an amount calculated to achieve from about 0.2% up to about 2.0% of co-precipitated oxide and/or phosphate, by weight based on titanium dioxide. The acetate, chloride, nitrate, and sulfate metal salts are preferred.

Typically, the wet treatment mixed inorganic oxides and/or phosphates are deposited according to the process of the instant invention in amounts as an additive sum from about 0.2% up to about 10% by weight calculated on treated pigment, preferably from about 0.5% up to about 8% by weight calculated on treated pigment, most preferably from about 1.0% up to about 5% by weight calculated on treated pigment, wherein the weight ratio of the deposited oxide and/or phosphate from the alkali-soluble source of an inorganic oxide and/or phosphate to the deposited oxide and/or phosphate from the acid-soluble source of an inorganic oxide and/or phosphate is between about 30:1 to about 1:10. Preferred is a ratio between about 20:1 to about 1:1. Most preferred is a ratio between about 15:1 to about 2:1.

Pertaining to step (e) in both aspects of the present invention, the optional wet treatment aluminum oxide can be applied utilizing any of the known processes for depositing aluminum oxides onto the titanium dioxide. Typically, when present, the wet treatment aluminum oxide is present in an amount from about 0.5% up to about 5% by weight calculated on treated pigment. The optional wet treatment aluminum oxide can also have optionally co-deposited therein co-precipitated oxides and/or phosphates without departing from the spirit and scope of the invention.

Further processing of the wet-treated titanium dioxide pigment particles can be accomplished by filtration using a vacuum-type filtration system or a pressure-type filtration system, washing, and drying, using any of the procedures known in the art. For drying, this would include vacuum drying, spin-flash drying, or spray drying to produce a dry titanium dioxide pigment powder. The preferred method is spray drying. The dry product thus produced can be optionally ground to a desired final particle size distribution using, for example, conventional steam micronization in the presence or absence of additional functional additives as known in the art.

The following examples serve to illustrate specific embodiments of the instant invention, without intending to limit or restrict the scope of the invention as disclosed herein. Concentrations and percentages are by weight unless otherwise indicated.

ILLUSTRATIVE EXAMPLES

Example 1

Particulate titanium dioxide pigment intermediate obtained from the vapor phase oxidation of titanium tetrachloride containing 1.0% alumina was dispersed in water in the presence of 0.15% by weight (based on pigment) of sodium hexametaphosphate dispersant, along with a sufficient amount of sodium hydroxide to adjust the pH of the dispersion to a value of 9.5 or greater, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer (Microtrac Inc. Montgomeryville, Pa.).

The resulting slurry, diluted to 30% solids by weight, was heated to 90° C. and subsequently treated with 3.0%, calculated as silica by weight of final pigment, of sodium silicate, added over 20 minutes as a 250 gram/liter aqueous sodium silicate solution. While maintaining the temperature at 90° C., the pH of the slurry was slowly decreased to a pH of 5.0 over a 55 minute period via the slow addition of 36% by weight aqueous sulfuric acid solution, said sulfuric acid solution containing zirconium oxychloride dissolved therein at a concentration calculated to achieve 0.2%, by weight based on titanium dioxide, of co-precipitated zirconium oxide. Following a digestion period of 15 minutes at a pH of 5, 2.0% alumina, by weight of final pigment, was added over 20 minutes as a 180 gram/liter aqueous sodium aluminate solution, while maintaining the pH of the slurry between a value of 8.0 and 8.5 via the concomitant addition of 36% aqueous sulfuric acid solution, said sulfuric acid solution containing no other dissolved ingredients.

The dispersion was allowed to equilibrate at 90° C. for 15 minutes, at which point the pH of the slurry was re-adjusted to 5.8, prior to filtration while hot. The resulting filter cake was washed with an amount of water, which had been preheated to 60° C. and pre-adjusted to a pH of 7.0, equal to 1.5 times the estimated weight of recovered pigment.

The washed semi-solid filter cake was subsequently re-dispersed in water with agitation, and dried using an APV Nordic PSD52 Spray Dryer (Invensys APV Silkeborg, Denmark), maintaining a dryer inlet temperature of approximately 280° C., to yield a dry pigment powder. The dry pigment powder was then steam micronized in the presence of 0.35% by weight based on pigment of trimethylol propane, utilizing a steam to pigment weight ratio of 2.5, with a steam injector pressure set at 146 psi and micronizer ring pressure set at 118 psi, completing the finished pigment preparation.

The zirconia content of the resulting pigment produced according to the inventive process was determined via known X-ray fluorescence techniques utilizing a PANalytical PW2404 Spectrometer (PANalytical B. V. Almelo, The Netherlands), with appropriate calibration to standards and matrix corrections.

To help determine the degree of effectiveness and uniformity of incorporation of the co-precipitated zirconia according to the process of the instant invention, pigment photocatalytic activity was determined utilizing the technique documented in T. I. Brownbridge and J. R. Brand, "Photocatalytic Activity of Titanium Dioxide Pigment", *Surface Coatings Australia*, September 1990, pages 6-11 (paper presented at the 32nd Annual SCAA Convention, Perth, Wash., September 1990), as referenced and further described in U.S. Pat. No. 5,730,796. This involves the steps of: (1) placing about 0.2 g of the $TiO_2$ product in about 40 ml of spectroscopic-grade isopropanol; (2) exposing the $TiO_2$/isopropanol composition to ultra-violet light; (3) monitoring the formation of acetone in the test composition over time; (4) determining, by linear regression analysis, a linear rate of acetone formation in the test composition; and (5) multiplying the calculated rate value by a factor of 1000. The resulting value (reported as High Sensitivity Photocatalytic Activity (HSPCA) slope) is proportional to the photocatalytic response of the pigment upon exposure to ultraviolet light, and provides a measure of accelerated weathering performance of coatings or plastics incorporating the pigment product. Smaller values indicate greater suppression of inherent titanium dioxide pigment photocatalytic activity, and therefore greater durability, or greater resistance to discoloration, both of which directly result from more efficient and uniform incorporation of co-precipitated zirconium oxides into the silica surface treatment.

Results are provided in Table 1, together with comparative results from two finished pigment samples; the first prepared utilizing the same procedure described above, except that the zirconium oxychloride reagent was batch-added at the beginning of the silica deposition step (Comparative Example 1A), and the second prepared utilizing the same procedure described above, but in the absence of the addition of zirconium oxychloride to the sulfuric acid solution used during the silica deposition step, thus replacing the mixed oxide treatment of co-precipitated silica and zirconia with 3% deposited silica (Comparative Example 1B).

TABLE 1

Pigment Zirconia Content and Photocatalytic Activity Value

| Pigment Sample | Co-precipitated Zirconia content (wt. %) | HSPCA slope |
|---|---|---|
| Example 1 | 0.20 | 1.0 |
| Comparative Example 1A | 0.20 | 2.3 |
| Comparative Example 1B | none | 2.5 |

Example 1 illustrates the novel process of the instant invention, wherein titanium dioxide pigment is produced having deposited thereon in two sequential steps, a mixed inorganic oxide wet treatment comprising 3.0% dense silica co-precipitated with 0.2% zirconia, followed by 2.0% alumina (percents are by weight of the pigment). The substantial durability performance increase (decreased HSPCA value versus comparative example) of the inventive pigment indicates uniform incorporation of the co-precipitated zirconia into the silica treatment. The resulting titanium dioxide pigment is particularly useful in the production of end-use articles and compositions including plastics and coatings, especially for exterior applications.

Example 2

Particulate titanium dioxide pigment intermediate obtained from the vapor phase oxidation of titanium tetrachloride containing 1.0% alumina was dispersed in water in the presence of 0.15% by weight (based on pigment) of sodium hexametaphosphate dispersant, along with a sufficient amount of sodium hydroxide to adjust the pH of the dispersion to a value of 9.5 or greater, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer.

The resulting slurry, diluted to 30% solids by weight, was heated to 90° C. and subsequently treated with 3.0%, calculated as silica by weight of final pigment, of sodium silicate, added over 20 minutes as a 250 gram/liter aqueous sodium silicate solution. While maintaining the temperature at 90° C., the pH of the slurry was slowly decreased to a pH of 5.0 over a 55 minute period via the slow addition of 36% by weight aqueous sulfuric acid solution, said sulfuric acid solution containing aluminum sulfate dissolved therein at a concentration calculated to achieve 0.5%, by weight based on titanium dioxide, of co-precipitated aluminum oxide. Following a digestion period of 15 minutes at pH=5, 2.0% alumina, by weight of final pigment, was added over 20 minutes as a 180 gram/liter aqueous sodium aluminate solution, while maintaining the pH of the slurry between a value of 8.0 and 8.5 via the concomitant addition of 36% aqueous sulfuric acid solution, said sulfuric acid solution containing no other dissolved ingredients.

The dispersion was allowed to equilibrate at 90° C. for 15 minutes, at which point the pH of the slurry was re-adjusted to 5.8, prior to filtration while hot. The resulting filter cake was washed with an amount of water, which had been preheated to 60° C. and pre-adjusted to a pH of 7.0, equal to 1.5 times the estimated weight of recovered pigment.

The washed semi-solid filter cake was subsequently re-dispersed in water with agitation, and dried using an APV Nordic PSD52 Spray Dryer, maintaining a dryer inlet temperature of approximately 280° C., to yield a dry pigment powder. The dry pigment powder was then steam micronized in the presence of 0.35% by weight based on pigment of trimethylol propane, utilizing a steam to pigment weight ratio of 2.5, with a steam injector pressure set at 146 psi and micronizer ring pressure set at 118 psi, completing the finished pigment preparation.

The alumina content of the resulting pigment produced according to the inventive process was determined via known X-ray fluorescence techniques utilizing a PANalytical PW2404 Spectrometer, with appropriate calibration to standards and matrix corrections.

To determine the degree of effectiveness and uniformity of incorporation of the co-precipitated alumina according to the process of the instant invention, pigment photocatalytic activity was determined as described in Example 1. Smaller values indicate greater suppression of inherent titanium dioxide pigment photocatalytic activity, and therefore greater durability, or greater resistance to discoloration, both of which directly result from more efficient and uniform incorporation of co-precipitated aluminum oxides into the silica surface treatment.

Results are provided in Table 2, together with comparative results from two finished pigment samples; the first prepared utilizing the same procedure described above, except that the aluminum sulfate reagent was batch-added at the beginning of the silica deposition step (Comparative Example 2A), and the second prepared utilizing the same procedure described above, but in the absence of the addition of aluminum sulfate to the sulfuric acid solution used during the silica deposition step, thus replacing the mixed oxide treatment of co-precipitated silica and alumina with 3% deposited silica (Comparative Example 2B).

TABLE 2

Pigment Zirconia Content and Photocatalytic Activity Value

| Pigment Sample | Total Alumina content (wt. %) | HSPCA slope |
|---|---|---|
| Example 2 | 3.5 | 1.2 |
| Comparative Example 2A | 3.5 | 2.0 |
| Comparative Example 2B | 3.0 | 2.5 |

Example 2 illustrates the novel process of the instant invention, wherein titanium dioxide pigment is produced having deposited thereon in two sequential steps, a mixed inorganic oxide wet treatment comprising co-deposited 3.0% dense silica and 0.5% alumina, followed by 2.0% alumina (percents are by weight of the pigment). The substantial durability performance increase (decreased HSPCA value versus comparative example) of the inventive pigment indicates uniform incorporation of the co-precipitated alumina into the silica treatment. The resulting titanium dioxide pigment is particularly useful in the production of end-use articles and compositions including plastics and coatings, especially for exterior applications.

Example 3

Particulate titanium dioxide pigment intermediate obtained from the vapor phase oxidation of titanium tetrachloride containing 1.0% alumina was dispersed in water in the presence of 0.15% by weight (based on pigment) of sodium hexametaphosphate dispersant, along with a sufficient amount of sodium hydroxide to adjust the pH of the dispersion to a value of 9.5 or greater, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer.

The resulting slurry, diluted to 30% solids by weight, was heated to 90° C. and subsequently treated with 3.0%, calculated as silica by weight of final pigment, of sodium silicate, added over 30 minutes as a 250 gram/liter aqueous sodium silicate solution in parallel with the addition of 36% by weight sulfuric acid solution to lower the slurry pH to 5, while maintaining the temperature at 90° C. Following a digestion period of 15 minutes at a pH of 5, 2.0% alumina, by weight of final pigment, was added over 20 minutes as a 180 gram/liter aqueous sodium aluminate solution, while maintaining the pH of the slurry at a value of 7.0 via the concomitant addition of 36% aqueous sulfuric acid solution, said sulfuric acid solution containing zirconium oxychloride dissolved therein at a concentration calculated to achieve 0.2%, by weight based on titanium dioxide, of co-precipitated zirconium oxide.

The dispersion was allowed to equilibrate at 90° C. for 15 minutes, at which point the pH of the slurry was re-adjusted to 5.8, prior to filtration while hot. The resulting filter cake was washed with an amount of water, which had been preheated to 60° C. and pre-adjusted to a pH of 7.0, equal to 1.5 times the estimated weight of recovered pigment.

The washed semi-solid filter cake was subsequently re-dispersed in water with agitation, and dried using an APV Nordic PSD52 Spray Dryer, maintaining a dryer inlet temperature of approximately 280° C., to yield a dry pigment powder. The dry pigment powder was then steam micronized in the presence of 0.35% by weight based on pigment of trimethylol propane, utilizing a steam to pigment weight ratio of 2.5, with a steam injector pressure set at 146 psi and micronizer ring pressure set at 118 psi, completing the finished pigment preparation.

The resulting pigment produced according to the inventive process was tested for zirconia content and photocatalytic activity as described in Example 1. Results are provided in Table 3, together with comparative results from two finished pigment samples; the first prepared utilizing the same procedure described above, except that the zirconium oxychloride reagent was batch-added immediately before the addition of the sodium aluminate solution (Comparative Example 3A), and the second prepared utilizing the same procedure described above, but in the absence of the addition of zirconium oxychloride to the sulfuric acid solution used during the alumina deposition step, thus replacing the mixed oxide treatment of co-precipitated zirconia and alumina with 2% deposited alumina (Comparative Example 3B).

TABLE 3

Pigment Zirconia Content and Photocatalytic Activity Value

| Pigment Sample | Co-precipitated Zirconia content (wt. %) | HSPCA slope |
| --- | --- | --- |
| Example 3 | 0.20 | 1.4 |
| Comparative Example 3A | 0.20 | 2.1 |
| Comparative Example 3B | none | 2.5 |

Example 3 illustrates the novel process of the instant invention, wherein titanium dioxide pigment is produced having deposited thereon in two sequential steps, an inorganic oxide wet treatment comprising 3.0% dense silica, followed by a mixed inorganic oxide wet treatment comprising 2.0% alumina co-precipitated with 0.2% zirconia (percents are by weight of the pigment). The substantial durability performance increase (decreased HSPCA value versus comparative example) of the inventive pigment indicates uniform incorporation of the co-precipitated zirconia into the alumina treatment. The resulting titanium dioxide pigment is particularly useful in the production of end-use articles and compositions including plastics and coatings, especially for exterior applications.

Example 4

Particulate titanium dioxide pigment intermediate obtained from the vapor phase oxidation of titanium tetrachloride and containing 0.6% alumina in its crystalline lattice was dispersed in water in the presence of 0.18% by weight (based on pigment) of sodium hexametaphosphate dispersant, along with a sufficient amount of sodium hydroxide to adjust the pH of the dispersion to a minimum value of 9.5, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer.

The resulting slurry, diluted to 30% solids by weight, was heated to 70° C. and acidified to pH of about 6.0 using 36% by weight sulfuric acid solution. Following a digestion period of 15 minutes at a pH of 6, 3.0% alumina, by weight of final pigment, was added over 20 minutes as a 180 gram/liter aqueous sodium aluminate solution, while maintaining the pH of the slurry at a value of 6 via the concomitant addition of 36% aqueous sulfuric acid solution, said sulfuric acid solution containing zirconium oxychloride dissolved therein at a concentration calculated to achieve 0.2%, by weight based on titanium dioxide, of co-precipitated zirconium oxide.

The dispersion was allowed to equilibrate at 70° C. for 15 minutes, at which point the pH of the slurry was re-adjusted to 7.0, prior to filtration while hot. The resulting filter cake was washed with an amount of water, which had been preheated to 60° C. and pre-adjusted to a pH of 7.0, equal to 1.5 times the estimated weight of recovered pigment.

The washed semi-solid filter cake was subsequently re-dispersed in water with agitation, and dried using an APV Nordic PSD52 Spray Dryer, maintaining a dryer inlet temperature of approximately 280° C., to yield a dry pigment powder. The dry pigment powder was then steam micronized in the presence of 0.35% by weight based on pigment of trimethylol propane, utilizing a steam to pigment weight ratio of 2.5, with a steam injector pressure set at 146 psi and micronizer ring pressure set at 118 psi, completing the finished pigment preparation.

The resulting pigment produced according to the inventive process was tested for zirconia content and photocatalytic activity as described in Example 1. Results are provided in Table 4, together with comparative results from two finished pigment samples; the first prepared utilizing the same procedure described above, except that the zirconium oxychloride reagent was batch-added immediately before the addition of the sodium aluminate solution (Comparative Example 4A), and the second prepared utilizing the same procedure described above, but in the absence of the addition of zirconium oxychloride to the sulfuric acid solution used during the alumina deposition step, thus replacing the mixed oxide treatment of co-precipitated zirconia and alumina with 3% deposited alumina (Comparative Example 4B).

TABLE 4

Pigment Zirconia Content and Photocatalytic Activity Value

| Pigment Sample | Co-precipitated Zirconia content (wt. %) | HSPCA slope |
| --- | --- | --- |
| Example 4 | 0.20 | 13 |
| Comparative Example 4A | 0.20 | 14 |
| Comparative Example 4B | none | 18 |

Example 4 illustrates the novel process of the instant invention, wherein titanium dioxide. pigment is produced having deposited thereon in a single step, a mixed inorganic oxide wet treatment comprising 3.0% alumina co-precipitated with 0.2% zirconia (percents are by weight of the pigment). The durability performance increase (decreased HSPCA value versus comparative example) of the inventive pigment indicates uniform incorporation of the co-precipitated zirconia into the alumina treatment. The resulting titanium dioxide pigment is particularly useful in the production of architectural and industrial coatings.

Example 5

Particulate titanium dioxide pigment intermediate obtained from the vapor phase oxidation of titanium tetrachloride containing 1.0% alumina was dispersed in water in the presence of 0.15% by weight (based on pigment) of sodium hexametaphosphate dispersant, along with a sufficient amount of sodium hydroxide to adjust the pH of the dispersion to a value of 9.5 or greater, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer.

The resulting slurry, diluted to 30% solids by weight, was heated to 70° C. and subsequently treated with 1.8%, calculated as alumina by weight of final pigment, of sodium aluminate, added over 20 minutes as a 180 gram/liter aqueous sodium aluminate solution, and 5.0% by weight of trisodium phosphate, added over ten minutes as a 10% solution in water. While maintaining the temperature at 70° C., the pH of the slurry was slowly decreased to a pH of 7.0 over a 55 minute period via the slow addition of 36% by weight aqueous sulfuric acid solution, said sulfuric acid solution containing zirconium oxychloride dissolved therein at a concentration calculated to achieve 0.2%, by weight based on titanium dioxide, of co-precipitated zirconium oxide. Following a digestion period of 15 minutes at a pH of 7, 3.2% alumina, by weight of final pigment, was added over 30 minutes as a 180 gram/liter aqueous sodium aluminate solution, while maintaining the pH of the slurry at value of 7 via the concomitant addition of 36% aqueous sulfuric acid solution, said sulfuric acid solution containing no other dissolved ingredients.

The dispersion was allowed to equilibrate at 70° C. for 15 minutes, at which point the pH of the slurry was re-adjusted to 7.0, prior to filtration while hot. The resulting filter cake was washed with an amount of water, which had been preheated to 60° C. and pre-adjusted to a pH of 7.0, equal to 1.5 times the estimated weight of recovered pigment.

The washed semi-solid filter cake was subsequently re-dispersed in water with agitation, and dried using an APV Nordic PSD52 Spray Dryer, maintaining a dryer inlet temperature of approximately 280° C., to yield a dry pigment powder. The dry pigment powder was then steam micronized in the presence of 0.35% by weight based on pigment of trimethylol propane, utilizing a steam to pigment weight ratio of 2.5, with a steam injector pressure set at 146 psi and micronizer ring pressure set at 118 psi, completing the finished pigment preparation.

The resulting pigment produced according to the inventive process was tested for zirconia content and photocatalytic activity as described in Example 1. Results are provided in Table 5, together with comparative results from two finished pigment samples; the first prepared utilizing the same procedure described above except that the zirconium oxychloride reagent was batch-added immediately following the addition of the trisodium phosphate solution (Comparative Example 5A), and the second prepared utilizing the same procedure described above, but in the absence of the addition of the zirconium oxychloride to the sulfuric acid solution used during the aluminum phosphate deposition step, thus replacing the mixed phosphate-oxide treatment of co-precipitated zirconia and aluminum phosphate with 3.8% deposited aluminum phosphate (Comparative Example 5B).

TABLE 5

Pigment Zirconia Content and Photocatalytic Activity Value

| Pigment Sample | Co-precipitated Zirconia content (wt. %) | HSPCA slope |
| --- | --- | --- |
| Example 5 | 0.20 | 2.6 |
| Comparative Example 5A | 0.20 | 2.8 |
| Comparative Example 5B | none | 3.9 |

Example 5 illustrates the novel process of the instant invention, wherein titanium dioxide pigment is produced having deposited thereon in two sequential steps, a mixed inorganic phosphate-oxide wet treatment comprising 3.8% aluminum phosphate co-precipitated with 0.2% zirconia, followed by 3.2% alumina (percents are by weight of the pigment). The durability performance increase (decreased HSPCA value versus comparative example) of the inventive pigment indicates uniform incorporation of the co-precipitated zirconia into the aluminum phosphate treatment. The resulting titanium dioxide pigment is particularly useful in the production of end-use articles and compositions including plastics, coatings, and, in particular, paper laminates.

What is claimed is:

1. A process for manufacturing a titanium dioxide pigment, comprising the steps of:
   a) preparing an aqueous alkaline slurry of a titanium dioxide base pigment, said titanium dioxide base pigment being produced by a sulfate process or a chloride process for producing titanium dioxide pigment;
   b) adding to said aqueous alkaline slurry of titanium dioxide base pigment at least one aqueous alkali-soluble source of an inorganic oxide;
   c) dissolving at least one aqueous acid-soluble source of an inorganic oxide and/or at least one aqueous acid-soluble salt of a cation capable of forming a water-insoluble phosphate into an aqueous sulfuric acid solution containing from about 5 percent by weight to about 98 percent of sulfuric acid;
   d) following step c), co-precipitating a uniform mixture of inorganic oxides and/or phosphates on said titanium dioxide base pigment by gradually adding said sulfuric acid solution to said aqueous alkaline slurry of titanium dioxide base pigment, said sulfuric acid solution being added to said aqueous alkaline slurry of titanium dioxide base pigment in an amount sufficient to achieve a final slurry pH value between about 4 and about 8.5 whereby the co-precipitation of the aqueous acid-soluble source of inorganic oxide and/or the aqueous acid-soluble salt of a cation capable of forming a water-insoluble phosphate occurs upon precipitation of the aqueous alkali-soluble source of an inorganic oxide.

2. A process according to claim 1, wherein the titanium dioxide base pigment selected has previously been surface treated to deposit at least one inorganic oxide thereon from the group consisting of the inorganic oxides of aluminum, boron, phosphorus, silicon, titanium and zirconium.

3. A process according to claim 2, wherein the titanium dioxide base pigment used to form the aqueous alkaline slurry includes from about 0.5 percent to about 5 percent by weight of the inorganic oxide or oxides, based on the weight of the treated pigment as a whole.

4. A process according to claim 1, wherein the at least one aqueous alkali-soluble source of an inorganic oxide added in step b) to the slurry of step a) is selected from the group consisting of the aqueous alkali-soluble oxide salts of aluminum, boron, phosphorus and silicon.

5. A process according to claim 4, wherein sodium or potassium salts of aluminum, boron, phosphorus or silicon are used and added in the form of an aqueous solution containing from about 1 percent to about 50 percent by weight of the dissolved salts.

6. A process according to claim 5, wherein sodium or potassium salts of aluminum, boron, phosphorus or silicon are used and added in the form of an aqueous solution containing from about 5 percent to about 40 percent by weight of the dissolved salts.

7. A process according to claim 6, wherein sodium or potassium salts of aluminum, boron, phosphorus or silicon are used and added in the form of an aqueous solution containing from about 15 percent to about 35 percent by weight of the dissolved salts.

8. A process according to claim 1, wherein the at least one aqueous acid-soluble source of an inorganic oxide or of a cation capable of forming a water-insoluble phosphate is selected from the group consisting of the aqueous acid-soluble salts of aluminum, cerium, tin, titanium and zirconium.

9. A process according to claim 8, wherein the at least one aqueous acid-soluble source of an inorganic oxide or of a cation capable of forming a water-insoluble phosphate is added and dissolved into the aqueous sulfuric acid solution in the form either of a previously prepared aqueous metal salt solution or in solid salt form.

10. A process according to claim 1, wherein the aqueous sulfuric acid solution used in step c) contains from about 20 percent by weight to about 50 percent by weight sulfuric acid.

11. A process according to claim 10, wherein the aqueous sulfuric acid solution used in step c) contains from about 25 percent by weight to about 40 percent by weight sulfuric acid.

12. A process according to claim 1, wherein the titanium dioxide base pigment is from about 5 percent to about 65 percent by weight of the aqueous alkaline slurry.

13. A process according to claim 12, wherein the titanium dioxide base pigment is from about 15 percent to about 45 percent by weight of the aqueous alkaline slurry.

14. A process according to claim 13, wherein the titanium dioxide base pigment is from about 25 percent to about 40 percent by weight of the aqueous alkaline slurry.

15. A process according to claim 1, wherein the uniform mixture of inorganic oxides and/or phosphates that are co-precipitated from the alkali-soluble and acid-soluble sources collectively comprise from about 0.2 percent to about 10 percent by weight of the titanium dioxide base pigment.

16. A process according to claim 15, wherein the uniform mixture of inorganic oxides and/or phosphates that are co-precipitated from the alkali-soluble and acid-soluble sources collectively comprise from about 0.5 percent to about 8 percent by weight of the titanium dioxide base pigment.

17. A process according to claim 16, wherein the uniform mixture of inorganic oxides and/or phosphates that are co-precipitated from the alkali-soluble and acid-soluble sources collectively comprise from about 1.0 percent to about 5 percent by weight of the titanium dioxide base pigment.

18. A process according to claim 15, wherein the weight ratio of co-precipitated oxide(s) and/or phosphate(s) from the alkali-soluble sources to the acid soluble sources thereof is from about 30:1 to about 1:10.

19. A process according to claim 18, wherein the weight ratio of co-precipitated oxide(s) and/or phosphate(s) from the alkali-soluble sources to the acid soluble sources thereof is from about 20:1 to about 1:1.

20. A process according to claim 19, wherein the weight ratio of co-precipitated oxide(s) and/or phosphate(s) from the alkali-soluble sources to the acid soluble sources thereof is from about 15:1 to about 2:1.

21. A process according to claim 1, further comprising depositing a wet treatment aluminum oxide onto the titanium dioxide base pigment, while maintaining a slurry pH between about 4 to about 8.5, after substantially completely co-precipitating the mixed inorganic oxides and/or inorganic oxide and phosphate combination onto the pigment according to step d).

22. A process for manufacturing a titanium dioxide pigment, comprising the steps of:
   a) dissolving at least one aqueous acid-soluble source of an inorganic oxide and/or at least one aqueous acid-soluble salt of a cation capable of forming a water-insoluble phosphate into an aqueous sulfuric acid solution;
   b) dissolving at least one alkali-soluble source of an inorganic oxide into an aqueous alkaline solution;
   c) forming an aqueous alkaline slurry of a titanium dioxide base pigment, said titanium dioxide base pigment being produced from a sulfate process or a chloride process for producing titanium dioxide;
   d) after step c), co-precipitating a uniform mixture of inorganic oxides and/or phosphates on said titanium dioxide base pigment by gradually adding both said sulfuric acid solution and said aqueous alkaline solution to said aqueous alkaline slurry of titanium dioxide base pigment, said sulfuric acid and aqueous alkaline solutions being added to said aqueous alkaline slurry of titanium dioxide base pigment in amounts sufficient to achieve a final slurry pH value between about 4 and about 8.5 whereby the co-precipitation of the aqueous acid-soluble source of inorganic oxide and/or the aqueous acid-soluble salt of a cation capable of forming a water-insoluble phosphate occurs upon precipitation of the alkali-soluble source of an inorganic oxide.

23. A process for manufacturing a titanium dioxide pigment, comprising the steps of:
   a) preparing an aqueous alkaline slurry of a titanium dioxide base pigment, said titanium dioxide base pigment being produced by a sulfate process or a chloride process for producing titanium dioxide pigment;
   b) adding to said aqueous alkaline slurry of titanium dioxide base pigment at least one aqueous alkali-soluble source of an inorganic oxide;
   c) dissolving at least one aqueous acid-soluble source of an inorganic oxide and/or at least one aqueous acid-soluble salt of a cation capable of forming a water-insoluble phosphate into an aqueous acid solution containing from about 5 percent by weight to about 98 percent of an aqueous acid;
   d) following step c), co-precipitating a uniform mixture of inorganic oxides and/or phosphates on said titanium dioxide base pigment by gradually adding said aqueous acid solution to said aqueous alkaline slurry of titanium dioxide base pigment, said aqueous acid solution being added to said aqueous alkaline slurry of titanium dioxide base pigment in an amount sufficient to achieve a final slurry pH value between about 4 and about 8.5 whereby the co-precipitation of the aqueous acid-soluble source of inorganic oxide and/or the aqueous acid-soluble salt of a cation capable of forming a water-insoluble phosphate occurs upon precipitation of the aqueous alkali-soluble source of an inorganic oxide.

24. A process for manufacturing a titanium dioxide pigment, comprising the steps of:
   a) dissolving at least one aqueous acid-soluble source of an inorganic oxide and/or at least one aqueous acid-soluble salt of a cation capable of forming a water-insoluble phosphate into an aqueous acid solution;
   b) dissolving at least one alkali-soluble source of an inorganic oxide into an aqueous alkaline solution;
   c) forming an aqueous alkaline slurry of a titanium dioxide base pigment, said titanium dioxide base pigment being produced from a sulfate process or a chloride process for producing titanium dioxide;
   d) after step c), co-precipitating a uniform mixture of inorganic oxides and/or phosphates on said titanium dioxide base pigment by gradually adding both said aqueous acid solution and said aqueous alkaline solution to said aqueous alkaline slurry of titanium dioxide base pigment, said aqueous acid and aqueous alkaline solutions being added to said aqueous alkaline slurry of titanium dioxide base pigment in amounts sufficient to achieve a final slurry pH value between about 4 and about 8.5 whereby the co-precipitation of the aqueous acid-soluble source of inorganic oxide and/or the aqueous acid-soluble salt of a cation capable of forming a water-insoluble phosphate occurs upon precipitation of the alkali-soluble source of an inorganic oxide.

* * * * *